W. R. DENMAN.
COLLAPSIBLE CORE.
APPLICATION FILED SEPT. 14, 1915.
1,170,424.
Patented Feb. 1, 1916.
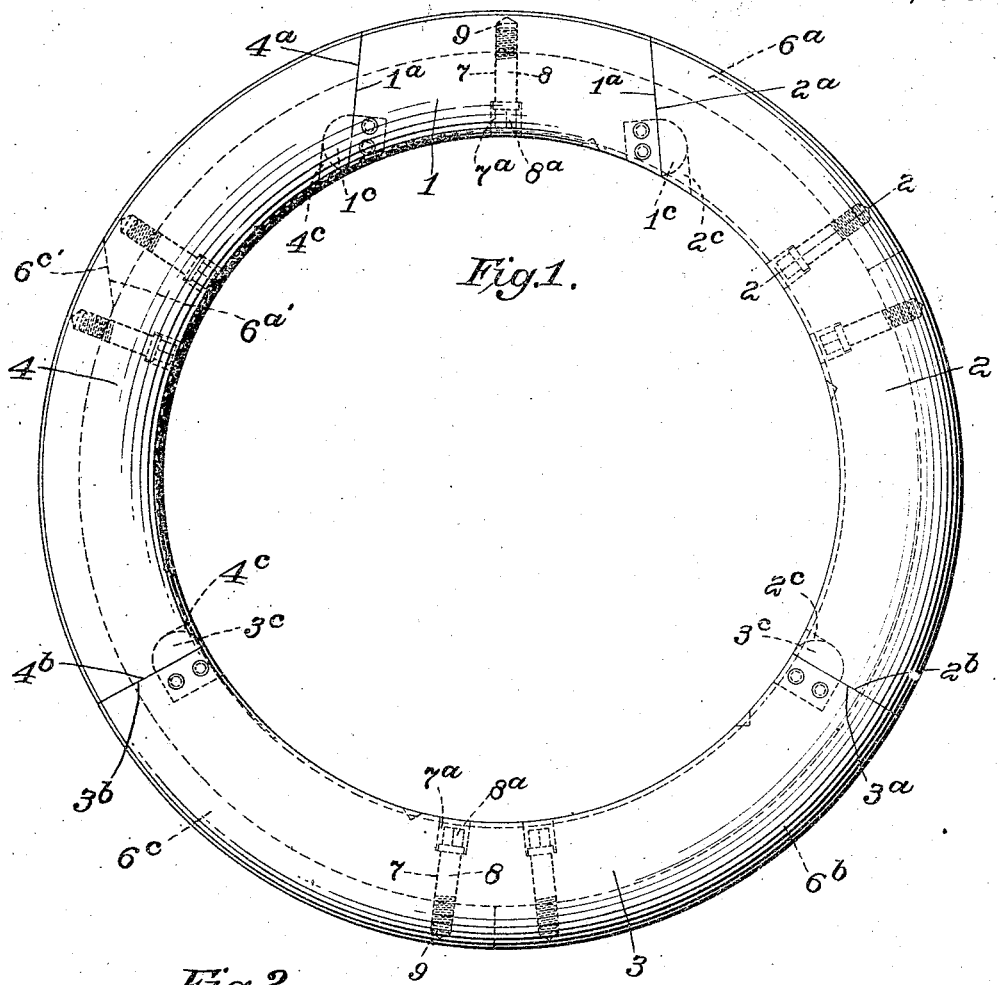
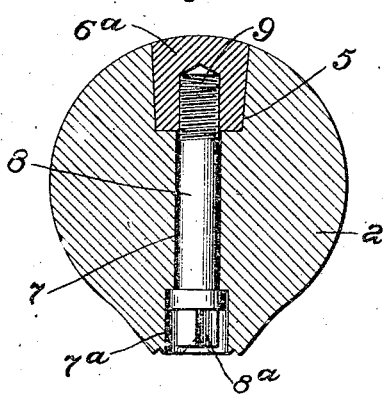
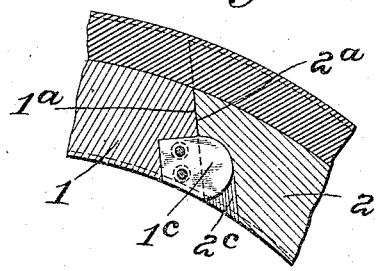
Inventor:
Walter R. Denman,
by Charles E. Parsons
Atty

UNITED STATES PATENT OFFICE.

WALTER R. DENMAN, OF AKRON, OHIO, ASSIGNOR TO MILLER RUBBER COMPANY, OF AKRON, OHIO, A CORPORATION OF OHIO.

COLLAPSIBLE CORE.

1,170,424.

Specification of Letters Patent.

Patented Feb. 1, 1916.

Application filed September 14, 1915. Serial No. 50,643.

*To all whom it may concern:*

Be it known that I, WALTER R. DENMAN, a citizen of the United States, residing at Akron, in the county of Summit and State of Ohio, have invented certain new and useful Improvements in Collapsible Cores, of which the following is a specification.

The present invention relates to improvements in collapsible cores, or mandrels, and pertains more particularly to that type of segmental core as is used in the construction of pneumatic tire shoes.

The principal object of the invention is to provide a collapsible core composed of segments which, when assembled, will conform to the inner contour of a tire-shoe, and thus provide a suitable space within the tire casing for the inner pneumatic tube.

Further objects of the invention consist in providing a core of the type above set forth which can be easily and quickly withdrawn from the finished tire casing, yet one which, during the process of winding or building up the casing, will be rigid and will not bulge or warp from a true circle.

With these and other objects in view, the invention consists of the combination and arrangement of parts more fully set forth in the following specification, illustrated in the accompanying drawings, and pointed out in the appended claims.

In the drawings, Figure 1 is a plan view of the assembled core; Fig. 2 is an enlarged transverse section on line 2—2 of Fig. 1; and Fig. 3 is an enlarged fragmental section of a detail.

Referring to the drawings, the main core is composed of a plurality of solid segments adapted to be secured end to end to form, when assembled, a complete ring core corresponding in size and shape to the inner dimensions of the finished shoe or casing. In the form shown in accompanying drawings, four such segments 1, 2, 3 and 4 are provided. The exact number and arrangement of segments may be varied at will. In order to facilitate the disassembling of the parts, one of the core segments 1 is formed with beveled ends $1^a$ diverging outwardly away from the center of the ring core. The two adjacent segments 2 and 4 are provided each with one beveled end $2^a$ and $4^a$ adapted to contact with the beveled end $1^a$ of the segment 1. The opposite ends $2^b$ and $4^b$ of the segments 2 and 4 respectively are squared, and are adapted to fit against the similarly squared ends $3^a$ and $3^b$ of the fourth segment 3. Segments 1 and 3 are provided at their ends with projecting lobes or plates $1^c$ and $3^c$ which are adapted to slide inwardly into suitably formed slots $2^c$ and $4^c$ at the inner ends of the segments 2 and 4 respectively.

Additional means for securing the parts together in their assembled form consist of a steel band ring also formed in segments. Each of the four core segments is provided with a centrally located annular groove 5 of substantially rectangular cross-section at its outer periphery. A segmental steel band comprising three segments $6^a$, $6^b$ and $6^c$ is provided, the several parts being formed with cross sections corresponding to the rectangular shape of the groove 5, and having their exterior surfaces curved to conform with the contour of the outer surface of the core segments. Two of the segments $6^a$ and $6^c$ are formed each with one beveled end $6^{a\prime}$, $6^{c\prime}$, adapted to overlap in a manner similar to the several core segment ends. The other ends of the ring segments are all squared, as shown.

The several core segments are provided with bolt holes 7 extending radially inward, and having enlarged portions $7^a$ to accommodate the squared ends $8^a$ of screw bolts 8. The ring segments are provided with screw threaded bores 9 extending radially inward at corresponding intervals adapted to receive the threaded inner ends of the bolts 8, and thereby clamp the ring segments securely around the core segments. It will be seen that the joints of the ring segments do not coincide with the core segment joints, but the arrangement is such that the ring segments overlap the adjoining ends of the core segments.

From the above description it will be seen that the core segments are assembled by being placed end to end with the lobes $1^c$ and $3^c$ fitted into the slots $2^c$ and $4^c$. The ring segments $6^a$, $6^b$ and $6^c$ are then placed in the annular grooves 5, and bolted in place by the bolts 8. After the tire shoe or casing has been built up around the core, the parts are disassembled and withdrawn through the inner circumferential opening in the following manner: The bolts 8 are first unscrewed and withdrawn, loosening the core segments from the outer ring segments. The core segments 1, 2, 3 and 4 are then removed in the order named, after which the ring segments are similarly withdrawn.

By constructing the parts and assembling them in the manner set forth, a collapsible core is provided which can be quickly and easily taken apart and removed. The provision of the outer steel band insert further insures a rigid structure upon which a cord tire carcass can be built, and one which will be incapable of warping or bulging.

Having described my invention what I claim is:—

1. A collapsible core comprising a plurality of separable segments and retaining means extending on the periphery circumferentially thereof.

2. A collapsible core comprising a plurality of separable segments having interlocking end connections, and circumferential retaining means extending around the outer periphery of said core.

3. A collapsible core comprising a plurality of separable segments and a segmental retaining band extending circumferentially around the outer periphery of said core.

4. A collapsible core comprising a plurality of separable segments, said segments each provided with an annular groove, and a retaining band extending on the periphery circumferentially of said core and fitting said annular grooves.

5. A collapsible core comprising a plurality of separable segments formed with an annular groove at their outer circumference; a retaining band encircling said core segments and fitting said annular groove.

6. A collapsible core comprising a plurality of separable segments, said segments being provided with an annular groove in their outer circumference, a segmental retaining band disposed within said annular groove, and lying flush with the exterior surface of the core segments.

7. A collapsible core comprising a plurality of separable segments, an outer segmental retaining band encircling said core segments, the several band segments overlapping the core segment joints, and means for removably attaching the core segments to the band segments.

8. A collapsible core comprising a plurality of separable segments having interlocking end connections, said segments being provided with an annular groove at the outer circumference of the core, a segmental retaining band disposed within said annular groove, the segments of said retaining band overlapping the joints of the core segments, and means for detachably securing said core segments to said band segments.

In testimony whereof I affix my signature in presence of two witnesses.

WALTER R. DENMAN.

Witnesses:
C. A. WOLF,
J. C. WOODWARD.

Copies of this patent may be obtained for five cents each, by addressing the "Commissioner of Patents, Washington, D. C."